United States Patent [19]

McKay

[11] 4,398,721
[45] Aug. 16, 1983

[54] NUTRITION EDUCATION GAME

[76] Inventor: Ruth B. McKay, 101 East Melbourne Ave., Silver Spring, Md. 20901

[21] Appl. No.: 298,116

[22] Filed: Aug. 31, 1981

[51] Int. Cl.³ .......................... A63F 3/00; G09B 19/00
[52] U.S. Cl. .................................... 273/249; 273/302; 434/127
[58] Field of Search ................ 434/127; 273/242, 243, 273/248, 249, 283, 288, 302

[56] References Cited

U.S. PATENT DOCUMENTS 4,040,628  8/1977  Pope ..................................... 273/343
4,159,117  6/1979  Kuna .............................. 273/288 X
4,174,840  11/1979  Curtiss .............................. 273/248

OTHER PUBLICATIONS

*Cleo Learning Aids* Catalog.
*Super Sandwich* ©1973 by Teaching Concepts, Inc.

*Primary Examiner*—William H. Grieb
*Attorney, Agent, or Firm*—Robbins & Laramie

[57] ABSTRACT

A board game is designed to convey nutritional education, by assigning to each space along a playing path on the board an association with a food. This association includes some nutritional characteristic such as its salt content per serving. The object of the game is for each player's piece to traverse the playing path while accumulating, by the piece landing on different spaces, a number of different food associations characterized by a total content of the particular ingredient in question. With substances such as salt, absorbable cholesterol, or saturated fat, the winner is the player having the smallest total amount of the ingredient.

7 Claims, 6 Drawing Figures

SALT TALLY
BREAKFAST
  MAIN DISH  _____
  SIDE DISH  _____
LUNCH
  MAIN DISH  _____
  SIDE DISH  _____
DINNER
  MAIN DISH  _____
  SIDE DISH  _____
SNACK
  BEVERAGE  _____
  SNACK  _____
TOTAL _____ Units
FIG. 4
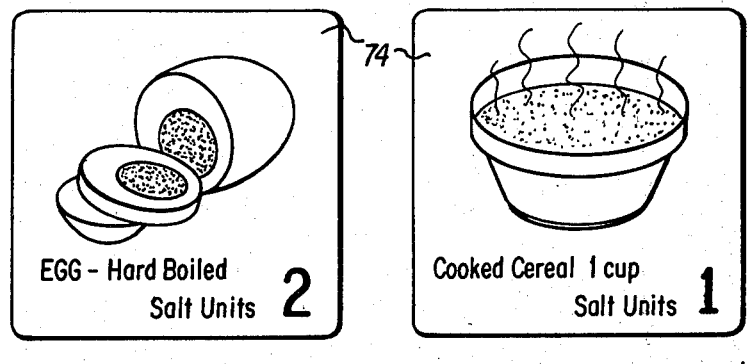
FIG. 5
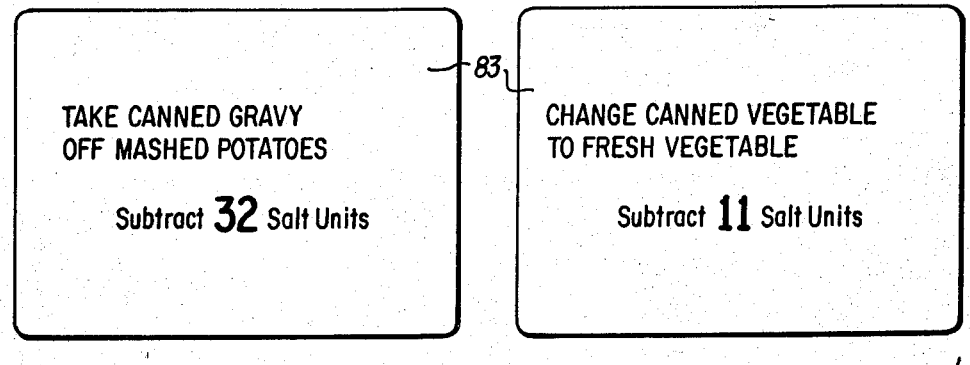
FIG. 6

NUTRITION EDUCATION GAME

FIELD OF THE INVENTION

This invention relates to a board game that is designed to convey instruction about nutrition as well as to provide entertainment. More particularly, the board game of the invention, in its preferred embodiments, is designed to educate the players as to the different amounts of one or more specific components that are present per serving in commonly consumed foods. Such components include salt, sugar, polyunsaturated fat, cholesterol, iron and other minerals, vitamins, and the like.

BACKGROUND OF THE INVENTION

In the opinion of a growing number of scientists, salt and other sources of sodium in the diet should be kept to a minimum. Keeping sodium to a minimum is believed to be particularly important for blacks and for the elderly, who are considered to be more susceptible to high blood pressure than the general population of the United States.

At the present time, Americans apparently consume about ten times the amount of salt as is needed for good health. Some studies have indicated that adults eat, on the average, the equivalent of from two to five teaspoons of salt and other sodium sources each day, taking into account the sodium that occurs naturally in the food, what is added during the processing of processed foods, and what is added in the kitchen during cooking. The per capita consumption is about 15 pounds of salt per year.

Individuals who wish to limit sodium intake can do so by reducing or eliminating completely the use of salt as a condiment, and by reducing the intake of foods that are prepared in brine, such as pickles, salted or smoked meat, and salted or smoked fish. However, members of the general public are often unaware that many foods contain large amounts of sodium. For example, the sodium level in some canned and processed foods is as much as 700 times higher than in the raw foodstuff. Thus, one brand of fried rice contains 700 milligrams of sodium per ½ cup compared to only 1 milligram of sodium in unprocessed steamed rice. Similarly, one cup of canned peas contains about 400 milligrams of sodium, compared to two milligrams for fresh cooked peas.

For convenience, foods can be categorized as having a low sodium content, a moderate sodium content, and a high sodium content. Representative foods in these three categories are tabulated below.

Low sodium content: All fresh fruits. Cereals such as puffed wheat and puffed rice, shredded wheat, cream of rice, and fresh oatmeal.

Moderate sodium content: Milk products (other than buttermilk) such as cream, sour cream, cream cheese, cottage cheese, and other cheeses. Fresh vegetables such as carrots and celery. Fresh protein products such as shrimp, salt-water fish, oysters, liver, eggs, beef, pork, and poultry. Miscellaneous items such as salad dressings, and sunflower and sesame seeds.

High sodium content: Canned and smoked meats; meats, fish and poultry preserved with sodium nitrite, such as ham, bacon, and hot dogs, chipped beef; and herring. Vegetables such as sauerkraut, canned vegetables, canned tomato products, spinach, beets, pickled vegetables, and frozen and instant potatoes. Starchy foods such as salted crackers, prepared seasoned mixes of rice and pasta, and breads with salted tops. Buttermilk. Miscellaneous foods such as bouillon cubes, monosodium glutamate seasonings, soy sauce, olives, salted nuts, canned soups, potato chips, and baking powder. Fast foods such as pizza, fish and chips, and hamburgers.

Unfortunately, most people are not aware of the different salt contents of foods. However, the excessive average salt intake by Americans is considered sufficiently serious that salt, one of the most widely used of all food ingredients, has been classified with additives that scientists believe should be more tightly restricted or even prohibited from use in foods.

Thus, the Select Committee on GRAS Substances of the Federation of American Societies for Experimental Biology, the scientific review group, has said that a reduction in the use of salt in processed foods would help between 10% and 30% of the population with a genetic tendency to high blood pressure. Such a reduction might even lower the incidence of the condition, the panel said.

The Washington Post for Dec. 31, 1980, reported that the Food and Drug Administration, responding to the recommendation of the Scientific Review Group mentioned above, had placed salt in a Class 4 status, meaning that restrictions were recommended.

There are also students of nutrition who are concerned about the levels of consumption of sugar, saturated fat, and cholesterol, which many consider to be excessive. There is also concern as to the levels of consumption of monosodium glutamate and saccharine, as well as of substances that should not be in the food chain at all, such as DDT, cyclamate, aflatoxins, PCB's, asbestos, and the like. Generally most members of the public have little or no awareness of the amount levels of these materials in foods.

THE PRIOR ART

Nutritional-oriented games that have been developed in the past have generally been concerned only with total calories, and there has been little or no real attempt in these games to provide an educational feature to permit discrimination between foods.

For example, the Pope U.S. Pat. No. 4,040,628 describes a diet game which is concerned with weight loss, but not through discrimination between foods. The Kuna U.S. Pat. No. 4,159,117 describes a board game that is designed around the theme of gaining and losing weight, and counting calories. The game provides opportunities to stop at such mock eating places as "Jelly Roll Jack's", "Devils Food Delight", and "Ice Cream Cohen's". When a player has a piece that stops at such an establishment, a weight is added to it. The losing player has the piece that weighs the most at the end of the game.

In the Curtiss U.S. Pat. No. 4,174,840, the game emphasizes the relationship between food consumption and exercise, for weight control. As in the Kuna patent, there are many opportunities for the consumption of what are obviously high calorie foodstuff, such as, for example, pecan pie and chocolate fudge. However, the Curtiss patent also mentions foods that are low in calories, such as honey dew melon and fresh strawberries. To this extent, the Curtiss patent can be said to involve an educational feature that teaches an element of discrimination between different kinds of foods. The game board itself provides a rough indication of the calorie values for several different kinds of foodstuffs.

Little has been done in the past to provide real nutritional information through games, although the necessary basic information that should be disseminated to the public, is readily available. For example, as a tentative guideline, the National Academy of Sciences and the National Heart, Lung and Blood Institute have indicated that children over 12 and adults should eat not more than one teaspoon of salt per day. This single teaspoon of salt should include the salt that is naturally present in food, the salt that manufacturers add to the food when it is processed or canned, salt added to food when it is cooked, as well as any salt added as a condiment at the table.

The controversy over the amount of sugar in the diet still goes on. One primary objection is that sugar contributes only empty calories, and to the extent that it is used, diminishes the appetite and the need for other foods, such as fresh fruit, that contribute bulk, vitamins, and minerals, in addition to some carbohydrate.

As to polyunsaturated and saturated fats, and cholesterols, in foods, there is also some controversy. Many nutritionists believe that the serum cholesterol level correlates with the incidence of cardiovascular disease, and that changes in the serum cholesterol level can be effected as a result of diet. Specifically, many nutritionists believe that the serum cholesterol level is raised by a high intake of saturated fat; lowered when the fat intake is predominantly of unsaturated fat; and raised by a high intake of absorbable cholesterol. While many members of the public are aware that it is desirable to reduce the consumption of foods containing saturated fats in favor of those containing polyunsaturated fats, and to eliminate or reduce the intake of foods containing absorbable cholesterol, most members of the public are not really sensitive to the identities of the foods that would permit the more healthful kind of discrimination.

SUMMARY OF THE INVENTION

The present invention is a game board apparatus for a nutrition education game. It is intended to be played by two or more players. One primary purpose of the game is to communicate to its players the difference in the nutritional values of different foods, especially with respect to salt, sugar, saturated fat, and the like.

The game board apparatus includes a plurality of playing pieces, one for each player. The apparatus also includes a playing board that is formed with a plurality of marked sequential spaces. These sequential spaces together form a playing path that is to be traversed by each of the players' pieces.

A majority of the defined sequential spaces has means associated therewith, preferably comprising indicia on the spaces, that associates each space respectively with a class of edible items having some particular nutritional characteristic. A plurality of sets of cards is also provided. Each set of cards included individual cards each describing a different item of food within the class represented by its set. Each card not only identifies a food item but also a value for the particular nutritional feature with which the game is concerned.

In addition, there is a chance-determining means, such as a die or a spinner, for actuation by the players. This chance-determining means indicates the number of sequential spaces to be traversed by that player's playing piece in one turn.

In one preferred embodiment of the invention, called "HOLD THE SALT!", the game is intended to provide nutrition education with respect to the salt content of different foods. Accordingly, the nutritionally-identified spaces are associated, respectively, with different classes of food items, each such different class having a designated level (high or low) of salt content per serving. In this case the object of the game is to have the player's piece traverse the playing path, taking cards representing food items within the classes of food items associated with the nutritionally-identified spaces on which the playing piece lands, and noting salt values on the cards taken, subject to the rules of the game, while accumulating the lowest possible total amount of salt. The total amount of salt is determined by adding together the individual salt contents of the edible items of the cards drawn in accordance with the spaces on which the particular player's piece has stopped while traversing the playing path. In this case, the player accumulating the lowest total salt value is the winner.

While a game providing nutritional education with respect to salt represents one preferred embodiment of the invention, other preferred embodiments of the invention include, for example, games that educate with respect to the sugar, or the absorbable cholesterol contents respectively, of edible food items.

Similarly, the ratio of polyunsaturated fat to saturated fat is an important characteristic of foodstuffs from the nutritional standpoint. Since this characteristic is generally expressed as a ratio, in order to play the game utilizing both types of fat and their respective contents, it is necessary to record two fat content values on each card, a polyunsaturated-to-saturated (p/s) ratio on each card, and then calculate totals for each type of fat at the end of the game, for each player, then finally, calculate an overall p/s ratio for each player. Accordingly, where ratio values are assigned different edible food items rather than the total content of some particular component per serving, the calculations required are somewhat more difficult. For this reason, it is preferred that the spaces be identified with classes of edible items to which different levels of component content values per serving are assigned, such as, for example, a high value or a low value for the amount of salt in a single serving of pickle or other food item.

BRIEF DESCRIPTION OF THE DRAWINGS

In the drawings:

FIG. 4 is a top plan view of a salt tally sheet that could be modified for a nutritional educational game constructed in accordance with any one of several different preferred embodiments of the invention, for the convenient recording of a particular nutritional characteristic of each dish comsumed, such as, for example, as shown, the amount per serving of the food item of a particular component such as salt;

FIG. 5 depicts the faces of two representative low salt breakfast main dish cards for use with the game board of FIG. 1, and FIG. 6 depicts the faces of two representative fortune cards for use in conjunction with the game board of FIG. 1.

DETAILED DESCRIPTION OF A PREFERRED EMBODIMENT

Figure 1A:
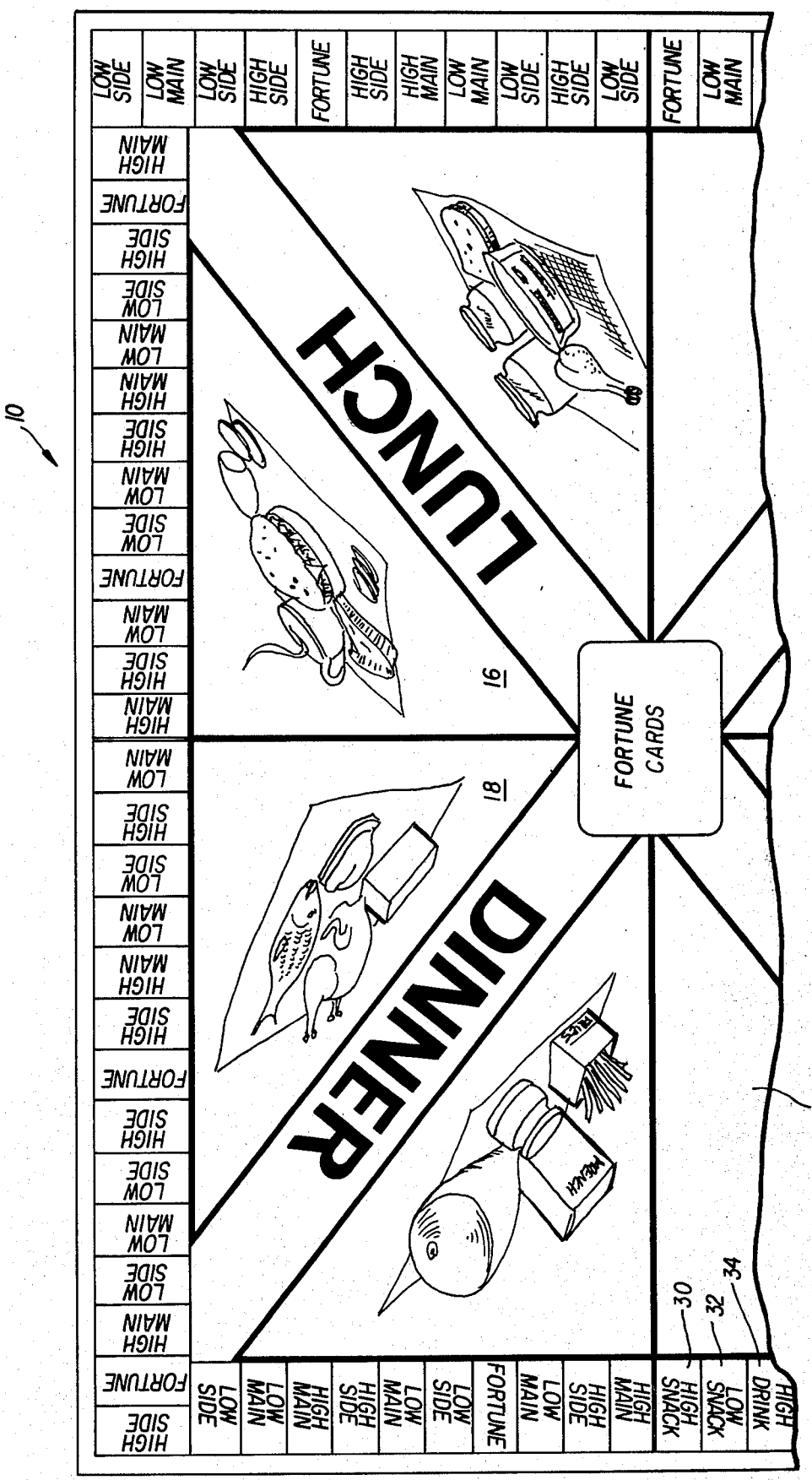
FIGS. 1A and 1B are each fragmentary views which, taken together, form a top plane view of a game board that is constructed and imprinted in accordance with one preferred embodiment of the invention, to impart information to its players with respect to the salt contents of different foods, and showing a place where a stack of fortune cards would be positioned for use during a game.
Figure 1B:
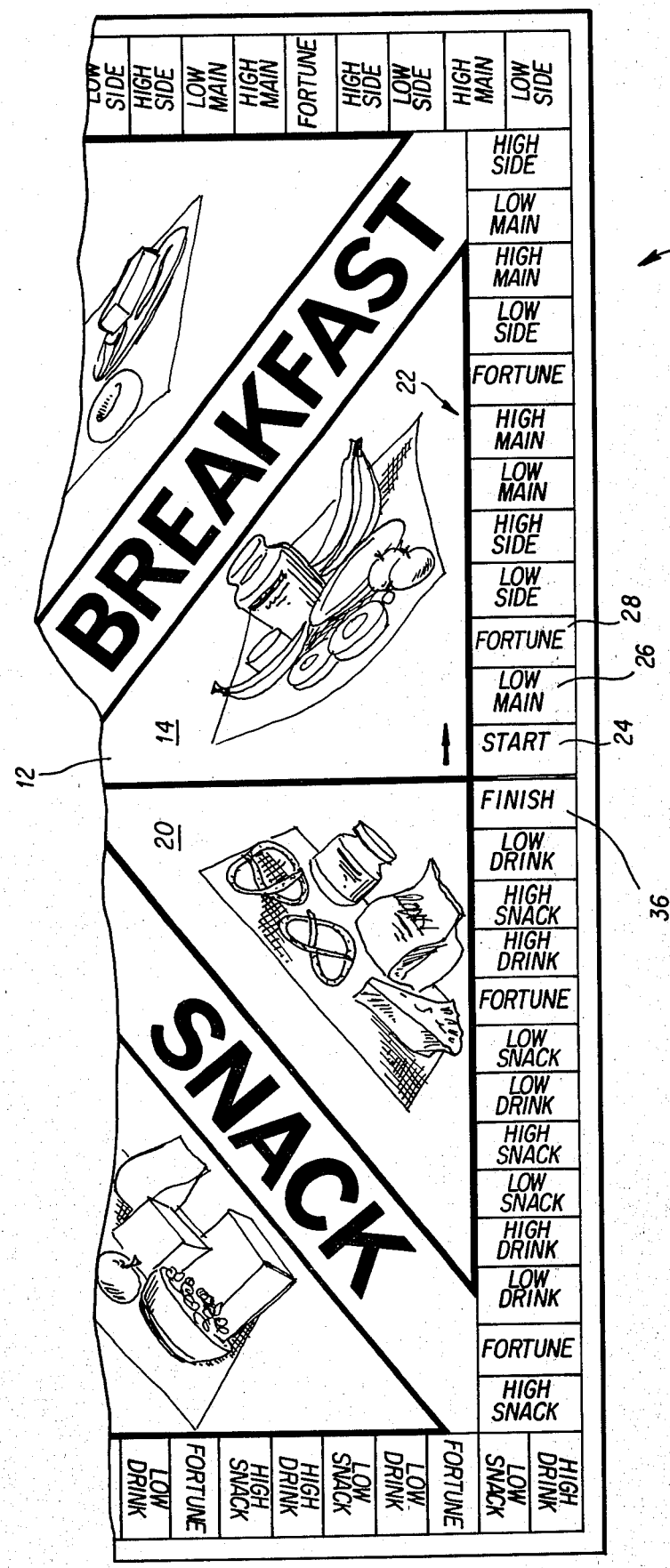
Figure 2:
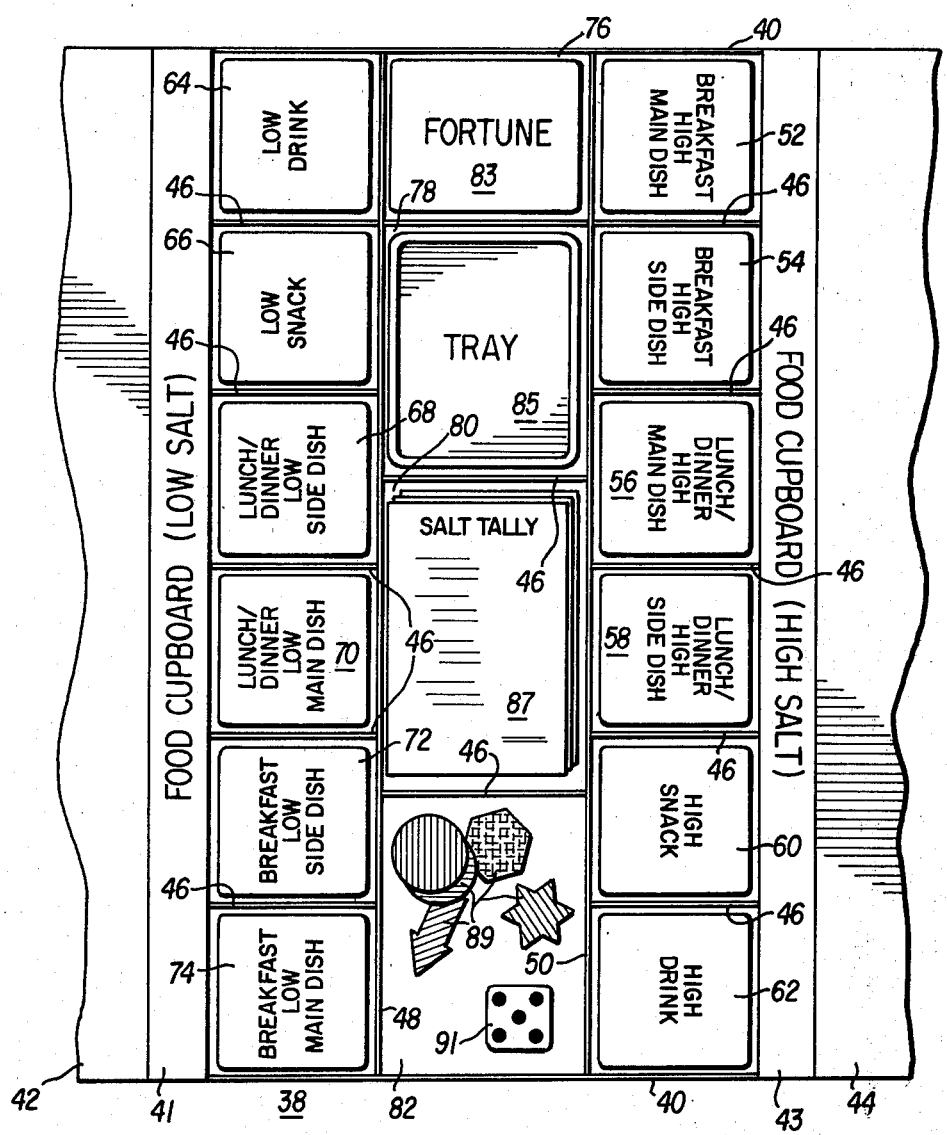
FIG. 2 is a fragmentary top plan view of a "food cupboard" box for holding edible item cards, "fortune" cards, "cafeteria trays", tally sheets, playing pieces, and the die or dice, for use in the same preferred embodiment of the invention.
Figure 3:
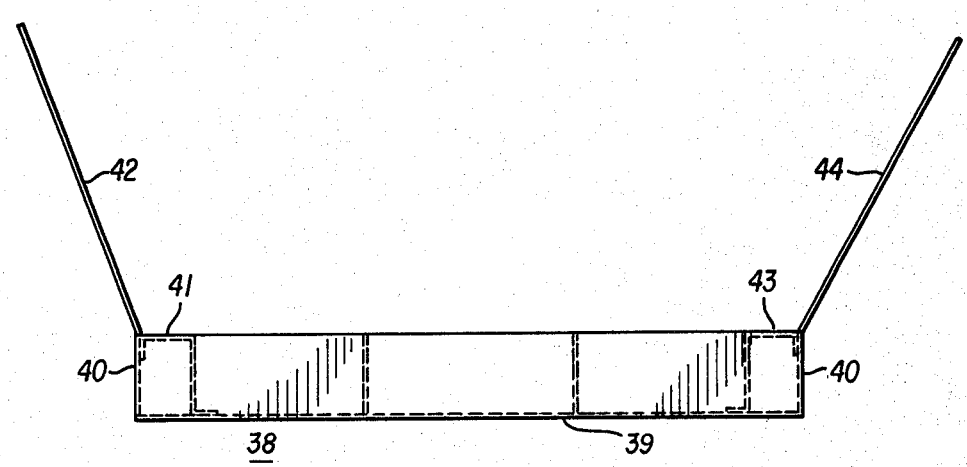
FIG. 3 is an end view of the "food cupboard" box.

Referring now in detail to the drawings by numerals of reference, the game board 10, shown in FIG. 1 (i.e., FIGS. 1A and 1B taken together), with the "food cupboard" box 38 shown in FIGS. 2 and 3, the food tally sheet 87 shown in FIG. 4, the food "dish" cards 74 of FIG. 5, and the "fortune" cards 83 of FIG. 6, are illustrated as designed for use in a game based upon the salt contents of different foods, respectively, in accordance with one preferred embodiment of the invention.

The game board 10 may be of a conventional type having a generally square upper playing surface 12. The game board is shown in FIG. 1 in a flat position, ready for play. The playing surface 12 is imprinted with indicia designating four quadrants, namely, a breakfast quadrant 14, a lunch quadrant 16, a dinner quadrant 18, and a snack quadrant 20.

A playing path 22 is laid out around the periphery of the playing surface 12. This playing path is formed from a plurality of sequential rectangular spaces. Thus, there is an initial start space 24, located in the breakfast quadrant, to indicate the beginning of a day's meals as the player starts to follow the path. The start space 24 is followed by several spaces carrying different indicia.

Thus, immediately following the start space 24 is a space 26 carrying the legend, "low main". Its purpose will be explained presently. The space 26 is followed by a space 28 carrying the legend "fortune". This in turn is followed by spaces carrying the legends "low side", "high side", "low main", "high main", "fortune", and so on. The terms "side" and "main" refer to dishes appropriate to the particular meal quadrant in which they occur. The terms "low" and "high" refer to the salt contents of these dishes.

These spaces continue sequentially around the periphery of the playing surface 12, to extend into the lunch quadrant 16. In that quadrant, a generally similar arrangement of identified spaces occurs. The sequence in which the identified individual spaces occur is not necessarily repetitive, but is varied somewhat as shown. This adds unpredictability and interest to the game. The path continues through the lunch quadrant 16 and the dinner quadrant 18, with somewhat similar legends on the spaces, but with the sequence of the individual identified spaces relative to each other being varied.

When the playing path 22 enters the snack quadrant 20, the legends change to be appropriate for edible items that might be consumed as snacks. Thus, the first identified space 20 in the snack quadrant carries the legend "high snack". It is followed by a second space 32 that carries the legend "low snack", which in turn is followed by a third space 34 carrying the legend "high drink". As in the other quadrants, the sequence of the differently identified spaces is varied to add interest.

The playing path 22 terminates in the snack quadrant with a space 36 carrying the appropriate legend "finish".

Referring now to FIGS. 2 and 3, the "food cupboard" box 38 is formed with a rectangular bottom 39 and four upright, interconnected walls 40. The two lengthwise walls of the box are provided with flaps 42, 44, respectively, that can be folded over to extend toward each other, to close the box, in which position they are generally in parallelism with the bottom of the box. Along each lengthwise side of the box there is adhered in place two shaped lengths of cardboard respectively, that form reinforcing stiffeners for the box and also provide surfaces 41 and 43 respectively, on which indicia may be printed. Thus the surface 41 carries the legend, "FOOD CUPBOARD (LOW SALT)". The surface 43 carries the legend "FOOD CUPBOARD (HIGH SALT)".

The volume within the box 38 is subdivided into small compartments by a plurality of transversely-extending walls 46, and by two walls, 48 and 50, that extend lengthwise of the box. In this way, several compartments are provided, among other things, for several stacks of cards that carry information corresponding to the legends on the nutritionally identified spaces on the game board. For example, in one stack of cards 52, each card carries on one surface the legend, "Breakfast High Main Dish", and on its other face identifies a main dish that would be suitable for a breakfast, and that is relatively high in salt content per serving.

Each similar stack of cards ordinarily will contain at least three and preferably five or more different cards of the kinds of cards stored in that stack. Each card will carry indicia on one face of the card indicating the compartment or stack in which the card belongs. Such a legend would be, for example, "Breakfast High Main Dish". The opposite surface of the card would identify a particular main dish, preferably pictorially in full color, along with text identifying the dish and its salt content per unit serving.

Representative breakfast high main dish items would be as follows: American cheese, two slices, 12 salt units; two pancakes, 4 inch diameter, 12 salt units; two slices of bacon, 6 salt units; cooked rice (salt used in cooking), ½ cup, 12 salt units; and dry breakfast cereal, 1 ounce, 12 salt units.

All of the spaces in the playing path, and preferably all of the cards, are color coded. For example, all of the high salt spaces and cards could be green, and all of the low salt spaces and cards could be yellow. As a further refinement, all of the fortune cards, as well as the space on the playing board on which they are stacked during play, could be orange or some other selected color.

Representative cards from the stack 54, for high salt side dishes for breakfast, carry on one side a pictorial representation of the side dish together with the number of salt units per serving, such as, for example: white bread, 2 slices with two pats of butter, 12 salt units; one piece of cornbread, 2½"×2½"×1½", without butter, 11 salt units; a baking powder biscuit without butter, 7 salt units; or a 2 ounce doughnut, 12 salt units.

Cards from the stack 56 for high salt main dishes for either lunch or dinner would carry on one side appropriate identifying indicia, such as "High Salt, Lunch/Dinner, Main Dish", or, as shown in the drawings, simply "HIGH LUNCH/DINNER MAIN DISH". On the other side, appropriate food items are represented pictorially in full color, together with descriptive legends and salt values such as, for example: homemade beef pie, ¼ lb., 13 salt units; 2 ounces of bologna, 29 salt units; 3 ounces of tuna fish packed in oil, 28 salt units; 1 slice of baked ham, 25 salt units; 1 fast food cheeseburger, 22 salt units; 3 ounces of canned spiced ham, 42 salt units; 1 cup of canned chili con carne, 54 salt units; 1 cup of chicken chow mein, 29 salt units; 1 cup of canned beef and vegetable stew, 40 salt units; and 1 frankfurter and bun, 33 salt units.

Representative high salt side dish items for either lunch or dinner, that could be depicted on the cards of the stack 58, could be, for example: ½ cup of canned black-eyed peas, 12 salt units; ½ cup of cooked rice (salt used in cooking), 12 salt units; 1 cup of canned chicken noodle soup, 39 salt units; 1 piece of cornbread, 2½"×2½"×1½", without butter, 11 salt units; 1 serving of mashed potatoes with gravy, 40 salt units; and ½ cup of canned corn, 10 salt units.

The cards from the stack 60 for high salt snack food items might depict items such as the following, which represent the spectrum of foodstuffs often used as snacks: 1 cup of salted popcorn, 7 salt units; 1 serving of instant pudding, 14 salt units; an average size piece of custard pie made from a commercial mix, 18 salt units; moderately salted french fries, 15 salt units; an average size piece of applie pie, 14 salt units; a 1 ounce bag of potato chips, 12 salt units; 1 ounce of salted pretzels, 19 salt units; a slice of pizza, 15 salt units; a 2 ounce doughnut, 12 salt units; and a large pickle, 80 salt units.

The cards in the stack 62 identify high salt snack beverages. One such representative beverage item is one cup of tomato juice, containing 20 salt units.

Turning now to the cards that identify low salt items, the cards in the stack 64 would identify low salt beverages that might be used between meals as snacks. Representative items would include: a 12 ounce can of gingerale, 3 salt units; a 12 ounce can of diet lemon-lime soda, 3 salt units; a 12 ounce can be diet cola, 1 salt units; 1 cup of orange juice, no salt; or 1 cup of milk, 5 salt units.

The cards in the stack 66 identify snack food items of low salt content. Representative items would include raisins, fresh fruit, and fresh raw vegetables, all of which have no salt content; jelly beans, no salt units; or a chocolate bar, unsalted potato chips, or a chocolate or vanilla sandwich cookie, each of which have 2 salt units; or 4 unsalted soda crackers, 4 salt units.

Representative low salt side dishes for either lunch or dinner would be identified in the cards in the stack 68. Such dishes include raw vegetables, fresh boiled potatoes, applesauce, and fresh corn, all of which have no salt units if no salt is added; or ½ cup of frozen black-eyed peas, containing 1 salt unit.

The cards in the stack 70 would depict low salt main dishes for either lunch or dinner. Representative items would include three ounces of tuna fish packed in water, four ounces of loin lamb chop, or four ounces of fresh baked pork, each of which contains only 2 salt units; 4 ounces of home broiled chicken, 4 salt units; fresh unsalted fish broiled in butter, 6 salt units; or 3 ounces of cottage cheese, 8 salt units.

The low salt side dishes for breakfast that could be depicted on the cards in the stack 72 include orange juice, fresh fruit, and applesauce, all of which contain no salt; or one cup of milk, 5 salt units.

The low salt main dishes for breakfast depicted on the cards in the stack 74 might include such items as unsalted cooked rice, one-half cup, no salt units; one cup of cooked cereal, 1 salt unit; one hard-boiled egg, 2 salt units; one tablespoon of peanut butter, 4 salt units, or two ounces of cottage cheese, 5 salt units.

Tabulations of the salt contents of different foods are readily available in standard reference works. Consequently it is relatively simple to develop appropriate items for additional cards. This might be particularly useful for educational use of this game in areas where particular ethnic groups are concentrated, whose food habits are somewhat different than those of the representative American diet from which the items mentioned above have been selected.

Four central compartments 76, 78, 80 and 82 are provided within the box 38. These compartments can be used, for example, for the stack of fortune cards 83; for the stack of "cafeteria trays" 85 on which the "dish" or other edible item cards can be stored for the several players respectively, each such card representing an item allocated to that player as the player's piece has traversed the playing path and landed on corresponding space; for the stack of salt tally sheets 87, and for the playing pieces 89 and die 91, or other change-indicating device.

The fortune cards 83 are each identified on one face by the legend "Fortune", and carry instructions on the other face. Representative instructions that could be placed on the fortune cards include instructions such as the following: treat yourself to a high salt snack; treat yourself to a low salt snack; add ketchup to the hamburger or hot dog, and add 6 salt units; or take the ketchup off the hamburger or hot dog, and subtract 6 salt units; have a whole pickle, and add 80 salt units, or put the whole pickle back into the jar, and subtract 80 salt units; take the salt off the popcorn, and subtract 6 salt units; add chili sauce to the hamburger or hot dog, and add 8 salt units, or take chili sauce off the hamburger or hot dog, and subtract 8 salt units; add pickle slices to the hamburger or hot dog, and add 5 salt units, or take pickle slices off the hamburger or hot dog, and subtract 5 salt units; trade salted for unsalted potato chips, and subtract 10 salt units; add salt to the french fries, and add 10 salt units; add cheese to the hamburger, and add 6 salt units; or take the cheese off the cheeseburger, and subtract 6 salt units; change canned vegetables to fresh vegetables, and subtract 11 salt units; or take the canned gravy off the mashed potatoes, and subtract 32 salt units. The instructions that can be printed on the fortune cards are limited only by the imagination.

The "cafeteria trays" 85 preferably are simply rectangular pieces of cardboard having upwardly inclined perimetral portions, on which "dish" and "snack" cards can be accumulated by each player as the game progresses. Small paper plates would also serve the purpose.

The salt tally sheet 87 shown in FIG. 4 carries legends to facilitate record keeping by each player, in a manner to be explained presently when the rules of the game, at least for this preferred embodiment of the invention, are explained.

The rules of the game, with respect to the illustrated embodiment of the invention, are rather simple. To begin playing, each player receives one of the playing pieces 89, a cafeteria tray 85, and a salt tally sheet 87. The die is then rolled to determine which player goes first.

In this game, the object is to get through the day while keeping salt consumption at a level that is considered healthful. For purposes of the game, 80 salt units are equivalent to the amount of salt contained in one teaspoon of salt; one salt unit equals 25 mg. of sodium. One teaspoon of salt (80 units) is the maximum amount of salt that is considered to be healthy for average daily consumption. Accordingly, the objective of the game for each player is to have the player's piece traverse the playing path, while collecting no more than 80 salt units.

As the player's piece moves over the playing path, the preferred rule is that the player must pick up two items from different classes from each quadrant. In a meal quadrant, for example, a complete meal would consist of a main dish and a side dish. In the snack quadrant, a complete snack would consist of a food item and a drink item. If a player manages to traverse the playing path through a quadrant without getting either a complete meal or a complete snack, then that player must take the appropriate missing item from the high salt portion of the Food Cupboard box 38. However, as soon as the player has landed on the spaces that provide a complete meal or a complete snack in any particular quadrant, then the player's piece may be moved to the final space in that quadrant, ready for the player's next turn. This makes for a fast game. In addition, only one card per quadrant is to be taken for a particular class of food, even though a player's piece lands on a space indicating otherwise.

Once a player has drawn a main dish for a particular meal selection, the player does not select (or draw) another main dish. Once a player has drawn a side dish for a particular meal section, the player does not select another side dish. Once a player has drawn a snack from the snack section, the player does not draw another snack. Once a player has drawn a drink from the snack section, he does not select another drink.

An exception to these rules must be made for the fortune cards. For example, in any quadrant, a player may acquire a fortune card directing the player to take a high salt snack card. This then is the only snack that player is entitled to, and if that player has already drawn a card for a low salt snack, then that low salt snack card is returned to the pack of fortune cards. But if the player has already drawn a high salt snack card, then the fortune card is ignored and returned to the pack, since each player is entitled to only a single snack.

One other way to play the game is to require the player to move the piece in accordance with the rolls of the die, but once a complete meal (or a complete snack) has been obtained in any particular quadrant, then no further cards need be drawn except fortune cards. This playing rule may make the game more interesting if there are a sufficient number of fortune spaces and if the fortune cards are cleverly developed to add interest to the game.

To start the game, one player rolls the die, and then moves the playing piece the number of spaces shown on the die. When the player lands, for example, on the space 26, which calls for a low main dish for breakfast, a card is drawn from the stack 74. The next roll of the die by the next player may carry that player's piece to a high main dish for breakfast. That player then draws a card from the stack 52.

Each drawn card will preferably carry a color picture and a legend indicating not only the particular dish that has been drawn by the player, but also the number of salt units per serving in that particular dish. The individual values are entered on the player's salt tally sheet.

As the player's piece traverse the breakfast quadrant, if it lands on a space carrying the legend "fortune", then a fortune card is removed from the stack of fortune cards that preferably is positioned centrally on the surface 12 of the game board. When a fortune card is drawn, the player must obey the instructions on the card, if possible. If the instructions are not applicable at that time, however, the player may set the card aside for use at such time as the instruction become applicable. After use, the card may be returned to the bottom of the pile.

After traversing the breakfast area, the playing piece enters the part of the playing path that traverses the lunch quadrant 16 of the playing board. The same sort of play occurs that took place in the breakfast quadrant. However, in this case, if the player's piece lands on a space carrying the legend "Low Main", then a card is drawn from the stack 70. If the piece lands on a space carrying the legend "High Main", then a card is drawn from the stack 56. The same general procedure is followed in traversing the section of the playing path in the dinner quadrant 18.

As each player collects both a main dish and a side dish for each main meal, the appropriate entries are made on the player's salt tally sheet for the number of salt units on the food cards drawn for that meal. A fortune card drawn by that player may lead the player to exchange a food item, and if so, the player then changes the number of salt units on the salt tally sheet in the appropriate fashion.

The procedure that is followed for traversing the path through the snack quadrant 20 is the same as in the main meal quadrants, except that the spaces are labeled differently. Thus, the snack may consist of a low salt drink or a high salt drink, and a low salt snack or a high salt snack. In traversing the snack quadrant, each player must either procure a snack and a drink by landing on the appropriate squares, or, if the player reaches the Finish space 36 without doing so, then the missing item must be selected from the high salt side of the Food Cupboard box shown in FIGS. 2 and 3.

Fortune cards may be traded between players at any time. In the event that a player picks two fortune cards that have contradictory instructions, the two cards are considered to cancel each other and are then returned to the bottom of the stack of fortune cards. Such contradictory instructions might consist, for example, of one card requiring the player to add ketchup to a sandwich and a second card commanding the player to take the ketchup off the sandwich.

Any roll of the die that carries the player's piece across the finish space ends the game. All players must cross the finish line before the game is considered to be terminated. The winner of the game, in this embodiment of the invention, is the player having the lowest total score of salt units at the end of the game.

GENERAL

Players participating in this game quickly learn the salt values per serving in many common foods. This valuable nutritional information may be imparted in a nonacademic environment and is quickly absorbed and retained. The game has been found to be a useful tool in primary schools, but its use is beneficial among adults as well.

The playing board has been shown in the drawings with the four quadrants arranged in a particular sequence, with the snack quadrant following the dinner quadrant and preceding the breakfast quadrant. However, the snack quadrant could be located wherever desired, such as, for example, between the breakfast and lunch quadrants or between the lunch and dinner quadrants.

The terms "food" and "edible item" are used herein in a broad sense to include solid foodstuffs such as meats, breads, and the like, liquid foods such as soups, and beverages such as tea and milk.

Instead of using a die to determine moves, two or more dice could be used, or a spinner, or any other chance-determiner operating by the laws of chance.

While the game has been described in detail with respect to the salt content of foods, it can be easily modified for use as an educational tool with respect to the sugar or saturated fat content in food, or the polyunsaturated fat content in food, or the absorbable cholesterol content in food. The basic principles are essentially the same, requiring modification only in the legends employed on the spaces of the playing path, the cards, and the tally sheets.

The game board apparatus is easily modified for educating with respect to sugar or absorbable cholesterol, rather than salt. For example, for a "HOLD THE SUGAR!" game that is analogous to the "HOLD THE SALT!" game described in detail above, the following texts could be used on specimen cards:

| BREAKFAST: | | |
|---|---|---|
| Main Dish | (High) | Sugar-coated Cereal |
| | (Low) | Bread and peanut butter |
| Side Dish | (High) | Doughnut |
| | (Low) | Cantaloupe |
| LUNCH/DINNER: | | |
| Main Dish | (High) | Ham with raisin sauce |
| | (Low) | Broiled chicken |
| Side Dish | (High) | Dried Fruit |
| | (Low) | Fresh Fruit |
| SNACK: | (High) | Candy Bar |
| | (Low) | Watermelon |
| DRINK: | (High) | Regular Soda Pop |
| | (Low) | Unsweetened grapefruit/orange juice |
| FORTUNE CARDS: | | |
| 1. Take syrup off pancakes. Subtract __ sugar units. | | |
| 2. Exchange candy bar for an apple. Subtract __ sugar units | | |
| 3. Spread a teaspoon of honey on bread. Add __ sugar units. | | |

Sugar units can be assigned to each dish, and a total per day selected, to provide a target figure that determines the winner of the game.

The fortune cards carry directions or instructions that interject unpredictableness into the game and makes it more enjoyable. Unusual instructions and humorous directions will add to the pleasure of the players.

It is also possible to modify the game, while maintaining its educational purpose, by eliminating all or some of the sets of cards that describe classes of foods, and printing all of the requisite information on spaces along the playing path. This is not preferred for several reasons. The use of cards permits the storage of more information per game board than would be possible if all of the information were on the game board. The use of cards makes the game more enjoyable. In addition, the use of cards provides a better educational tool than having all or a large part of the information on the board, because the player receives only individual units of learning, one per card, rather than a mass of information from the board. Experience indicates that there is better retention of information from the preferred embodiment of the invention.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. In a board game apparatus for a nutrition education game to be played by a plurality of players and having a plurality of playing pieces, one for each player, and a playing board having a plurality of defined sequential spaces constituting a playing path about the outer margin of said board, to be traversed by said pieces during the playing of the game, the improvement comprising:

means associated with a majority of said sequential spaces identifying each respectively with a serving amount of an edible item having some particular content of a specific nutrient that is preferably present in the human diet in a limited amount or not at all, and that is selected from the group consisting of salt, sugar, absorbable cholesterol, and saturated fat, such identified spaces being referred to hereafter as nutritionally-identified spaces, at least some individual spaces of said nutritionally-identified spaces being associated with servings of different edible items having different content amounts of said specific nutrient than others, chance-determining means for indicating a number of said sequential spaces in said playing path to be traversed by that player's playing piece in one turn, and wherein said playing path is divided into sections corresponding to different eating times, respectively, said means associated with said nutritionally-identified spaces comprises a legend on each space identifying a class of food items, and a plurality of sets of cards, there being one set of cards for each said class and for several food items in each class, the cards in each said set of cards identifying respectively individual food items in that class and reporting their respective content values for said specific nutrient, whereby each player completing a traversal of said playing path with the player's playing piece has the opportunity to have the piece stop in said path sections on a plurality of nutritionally-identified spaces representing respectively a plurality of different edible items each having different content amounts of said specific nutrient, and draw a card from the stack of cards corresponding to said class, the respective totals of the content amounts accumulated from the drawn cards for each of the several players being compared to select as the winner the player with the lowest total accumulated amount of said specific nutrient.

2. The board game of claim 1 wherein said board and said path are divided into quarters, each representing respectively eating times including breakfast, lunch, dinner and snack time, and wherein said food items comprise at least a main dish and a side dish for the meal times and a food item and a beverage item for the snack time.

3. The board game apparatus of claim 1 or 2 wherein the nutritional value that is assigned to each edible item is the amount of salt in that item per serving.

4. The board game apparatus of claim 1 or 2 wherein the nutritional value for each edible item is the total amount of sugar in that item per serving.

5. The board game apparatus of claim 1 or 2 wherein the nutritional value for each edible item is the amount of absorbable cholesterol in that item per serving.

6. The game board apparatus of claim 2 including a simulated food tray for each player on which said cards accumulated by each player can be stored as the game progresses.

7. In a board game apparatus for a nutrition education game to be played by a plurality of players and having a plurality of playing pieces, one for each player, and a playing board having a plurality of defined sequential spaces constituting a playing path about the outer margin of said board, to be traversed by said pieces during the playing of the game, the improvement comprising:
- means associated with a majority of said sequential spaces identifying each respectively with a serving amount of a class of an edible item having a particular content of salt, such identified spaces being referred to hereafter as nutritionally-identified spaces,
- a plurality of sets of cards, each set representing a class of foods having salt contents falling in a particular range, including none, and there being several different foods represented in each set of cards, the cards in each said set identifying respectively individual servings of individual food items and reporting their respective salt contents,
- said board and said playing path being divided into quarters, each said quarter representing respectively an eating time including breakfast, lunch, dinner and snack time, and wherein the said food items comprise at least a main dish and a side dish for the meal times and a food item and a beverage item for the snack time, and
- chance-determining means responsive to actuation by each player for indicating a number of said sequential spaces in said playing path to be traversed by that player's playing piece in one turn;
- whereby each player at each turn has the opportunity to have his piece land on a nutritionally-identified space having a particular set of cards associated therewith from which the player must take one;
- means associated with said game board for tallying the salt content value of each card drawn by each player,
- the respective totals of the salt content amounts accumulated for each player being compared to select as the winner the player with the lowest total accumulated amount of salt.

* * * * *